United States Patent
Ogawa et al.

[11] Patent Number: 5,930,907
[45] Date of Patent: Aug. 3, 1999

[54] UNIAXIAL HORIZONTAL SENSOR

[75] Inventors: Hideo Ogawa; Norihisa Teraji, both of Hachioji; Isshu Terauchi, Ikoma-gun, all of Japan

[73] Assignee: Nissho Corporation, Osaka, Japan

[21] Appl. No.: 08/803,029

[22] Filed: Feb. 19, 1997

[30] Foreign Application Priority Data

Mar. 15, 1996 [JP] Japan .................................. 8-059186

[51] Int. Cl.$^6$ ............................................. G01C 9/06
[52] U.S. Cl. .................................. 33/366.11; 33/366.14; 33/366.15
[58] Field of Search ................................ 33/366, 366.11, 33/366.12, 366.14, 366.15, 366.18, 366.19, 366.21, 366.22, 366.25, 366.26

[56] References Cited

U.S. PATENT DOCUMENTS

| 3,271,650 | 9/1966 | Riddle | 33/366 |
| 4,484,393 | 11/1984 | LaFreniere | 33/366 |
| 5,625,955 | 5/1997 | Han | 33/366 |

FOREIGN PATENT DOCUMENTS 2192057 12/1987 United Kingdom ...................... 33/366

*Primary Examiner*—Christopher W. Fulton
*Attorney, Agent, or Firm*—Armstrong, Westerman, Hattori, McLeland & Naughton

[57] ABSTRACT

A uniaxial horizontal sensor wherein factors causing errors are eliminated having high resolution and reproducibility and stability of detection with which a high levelness of inclination angle zero can be secured by attitude control has a construction wherein an electrode holding body (1) made of an insulating material has an electrode chamber (11) having an encircling wall with an inner peripheral wall surface of a high three-dimensional surface roughness and of a surface of rotation shape obtained by rotating a circular arc line (AL) of a predetermined radius with a point (P) on a vertical line (V) as its center and bisected by the vertical line (V) about a horizontal center axis (H) intersecting orthogonally with the vertical line (V) and having a common electrode (2) projecting into the electrode chamber (11) in the same position as the vertical line (V) and peripheral electrodes (3) in left-right symmetrical positions on either side of the common electrode (2) and projecting further into the electrode chamber (11) than the common electrode (2) and a bubble (5) and an electrolyte (4) mixed in such a ratio that the inter-electrode impedance becomes a predetermined value in the horizontal state are sealed inside the electrode chamber (11) in such a state that the common electrode (2) is always immersed in the electrolyte (4) and does not make contact with the bubble (5) and in the horizontal state the peripheral electrodes (3) also do not make contact with the bubble (5).

1 Claim, 3 Drawing Sheets

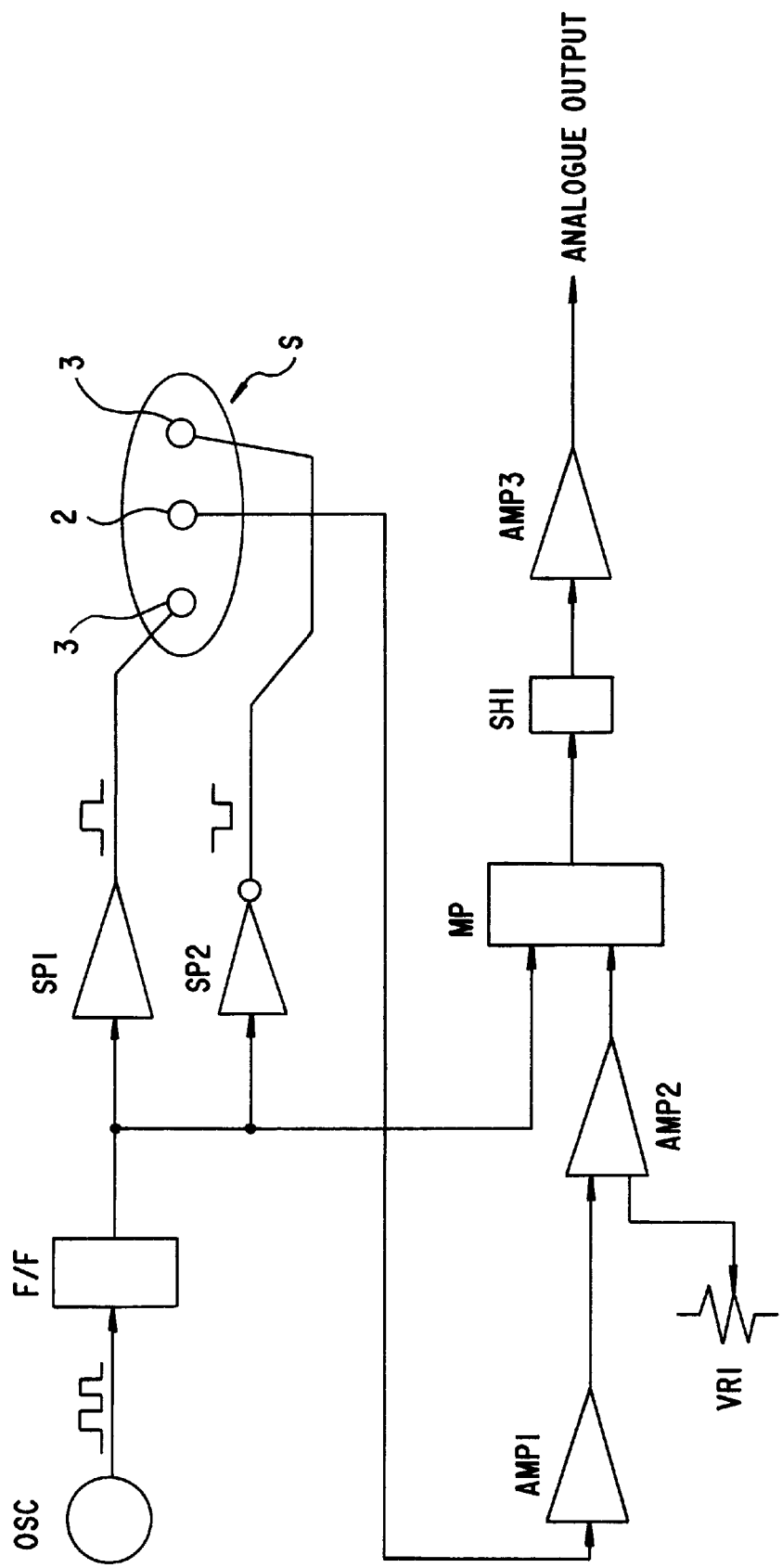

UNIAXIAL HORIZONTAL SENSOR

BACKGROUND OF THE INVENTION

1. Field of the Invention

This invention relates to a uniaxial horizontal sensor having a liquid and a bubble sealed inside a vessel for ascertaining levelness by detecting the position of the sealed bubble by means of an electrical signal, and is used in automatic leveling of machines and devices and in leveling devices, angle gauges, surveying instruments, measuring instruments, aircraft, ships, railway cars, automobiles and other applications where highly accurate levelness is required.

2. Description of the Prior Art

Known uniaxial horizontal sensors of this kind include:
1) those of a construction wherein as shown in FIG. 5 a glass pipe (g) is made in a shape curved in one axial direction, a common electrode plate (h) is disposed in a lower central position and opposite electrode plates (i) are disposed in two locations left-right symmetrically removed from the upper center and an electrolyte (j) with a large surface tension and a bubble (k) are so sealed inside the glass pipe (g) that in a range over which angle can be measured a part of each of the opposite electrode plates (i) makes contact with the bubble (k);
2) those of a construction wherein in a uniaxial inclination bubble pipe the position of the bubble is detected optically;
3) those of a construction wherein using a differential transformer an inductance balance change is detected; and
4) those of a construction wherein an output signal corresponding to the size of an electrostatic capacity is inputted into an arithmetic circuit and converted into a vessel inclination and angle (for example Japanese Unexamined Patent Publication No. H.3-142315).

The uniaxial horizontal sensor of 1) above is for the purpose of inclination angle zero horizontal attitude control, but because the degree of contact of the electrode plates with respect to the electrolyte is small, not only is there an influence on repeatability (repeat accuracy, hysteresis, etc.) but as a result of the construction using a glass pipe slight inclinations other than. in the axial direction to be measured, changes in the amount of contact of the electrolyte with the electrode plates due to expansion and contraction of the electrolyte caused by changes in the surrounding temperature of the sensor, and instability of the contact surfaces caused by the surface tension of the electrolyte become causes of accuracy errors and errors of reproducibility, and also because the surface tension of the electrolyte is large the response speed is slow and there is a risk of a phenomenon of the bubble breaking up as a result of vibration or the like occurring and causing large errors, and furthermore the structure makes mounting difficult, and for such reasons there has been the problem that it cannot be used as a sensor for securing high accuracy.

In the case of the uniaxial horizontal sensor of 2) above there is an influence of errors caused by deformation of the shape of the bubble due to temperature change and optical sensor errors because it depends on an optical sensor, and the sensors of 3) and 4) also have had the problem to be solved that similarly their degree of dependence on outside detecting devices is high and factors causing errors are large.

SUMMARY OF THE INVENTION

Accordingly, it is an object of this invention to eliminate these causes of error and provide a uniaxial horizontal sensor having high resolution and reproducibility and stable detection with which a high levelness of inclination angle zero can be secured by attitude control.

To achieve the above-mentioned object and other objects, a uniaxial horizontal sensor of the invention has a construction wherein severally disposed passing liquid tightly into an electrode holding body made of an insulating material having an electrode chamber for an electrolyte and a bubble to be sealed inside formed by an encircling wall having an inner peripheral wall surface of a high three-dimensional surface roughness and of a surface of rotation shape obtained by rotating a circular arc line of a predetermined radius with a point on a vertical line as its center and bisected by the vertical line about a horizontal center axis intersecting orthogonally with the radius of the circular arc line on the vertical line and therefore circular in any cross-section orthogonal to the horizontal center axis and sealing end plates blocking openings at the ends of the encircling wall are a common electrode projecting into the electrode chamber radially in the same position as the vertical line and peripheral electrodes projecting radially into the electrode chamber to a greater height than the common electrode in positions on the horizontal center axis left-right symmetrical about the common electrode as center and having equal surface areas, and a bubble and an electrolyte whose surface tension is small mixed in such a ratio that the inter-electrode impedance assumes a predetermined value when the sensor is horizontal are sealed inside the electrode chamber in such a state that the common electrode is always immersed in the electrolyte and does not make contact with the bubble and when the sensor is horizontal the peripheral electrodes also do not make contact with the bubble.

Using a common electrode and peripheral electrodes made of a metal material of low ionization tendency such as 18K(Au) and having the surface areas made equal by the surfaces being polished and using an electrolyte made by mixing pure water as a solvent, magnesium sulfate as a solute and either anhydrous methanol or anhydrous ethanol as a solution in such a ratio that the inter-electrode impedance becomes 40 to 50K$\Omega$ and thereby making its surface tension small, its boiling point high and its freezing point low and making the surface roughness of the inner peripheral wall surface of the electrode chamber JIS Rmax 0.2S or below is ideal because it eliminates causes of error and raises the resolution and reproducibility and stability of detection, but the invention is not limited to this.

In a uniaxial horizontal sensor according to the invention constructed as described above, among the common electrode positioned on a vertical line connecting the electrode chamber center and the center of curvature of the circular arc line of the inner peripheral wall surface at inclination angle zero (completely horizontal state) and vertically below a curved surface formed by rotating the circular arc line about the horizontal center line and the peripheral electrodes on the left and right thereof, the common electrode is always immersed in the electrolyte and does not make contact with the bubble, and in the horizontal state the peripheral electrodes are always immersed in a state such that they do not make contact with the bubble in the electrolyte having a small surface tension and mixed in such a ratio that the inter-electrode impedance becomes a predetermined value, and when the bubble displaces along the curved surface forming the inner surface of the electrode chamber due to the existence of an inclination angle the inter-electrode impedance changes according to the position of the bubble and this change can be converted directly into an electrical signal and outputted as an analogue angle information signal, and on the basis of this a motor drive or the like can be controlled to make the analogue signal zero and the sensor can be used for obtaining a levelness of high inclination angle zero accuracy.

In particular, because the inner wall of the electrode chamber is made an encircling wall having an inner peripheral wall surface of a high three-dimensional surface roughness and of a surface of rotation shape obtained by rotating a circular arc line of a predetermined radius with a point on a vertical line as its center and bisected by the vertical line about a horizontal center axis intersecting orthogonally with the vertical line and therefore circular in any cross section orthogonal to the horizontal center axis, with respect to inclinations other than the uniaxial horizontal to be measured, causes of measurement errors are eliminated, and because the common electrode is always immersed in the electrolyte and does not make contact with the bubble and in the horizontal state the peripheral electrodes do not make contact with the bubble and changes in inter-electrode impedance occurring due to positional displacement of the bubble are detected three-dimensionally the angle information output is high and output fluctuation errors caused by physical changes such as expansion and contraction and surface tension of the electrolyte occurring due to changes in the surrounding temperature are extremely small and it is possible to secure extremely high accuracy and reproducibility.

BRIEF DESCRIPTION OF THE DRAWINGS

FIG. 4 is a circuit diagram of a sensor circuit for use with a uniaxial horizontal sensor according to a preferred embodiment of the invention.

DETAILED DESCRIPTION OF THE PREFERRED EMBODIMENTS

Figure 1:
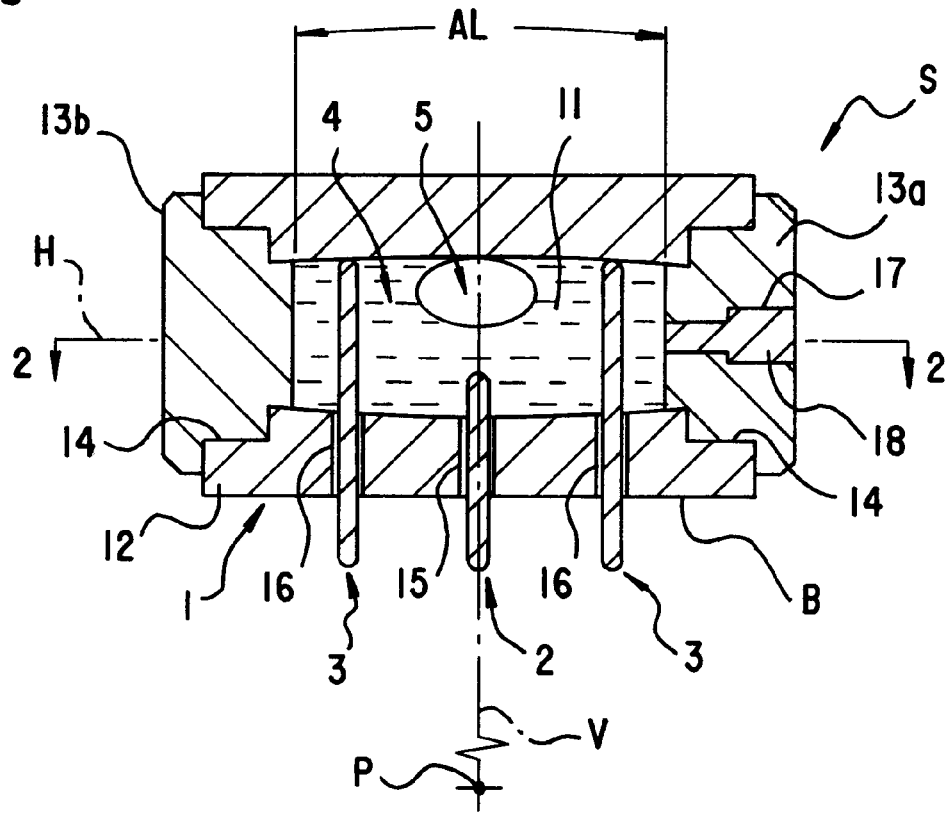
FIG. 1 is a length direction vertical sectional view of a uniaxial horizontal sensor according to a preferred embodiment of the invention.
Figure 3:
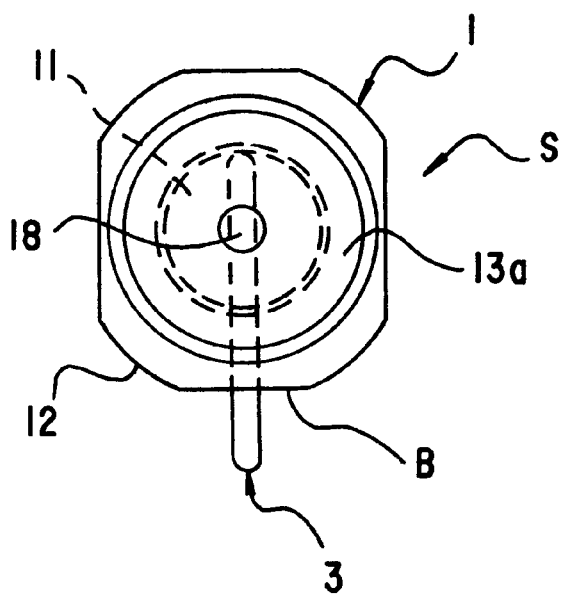
FIG. 3 is a side view of the uniaxial horizontal sensor.
Figure 5:
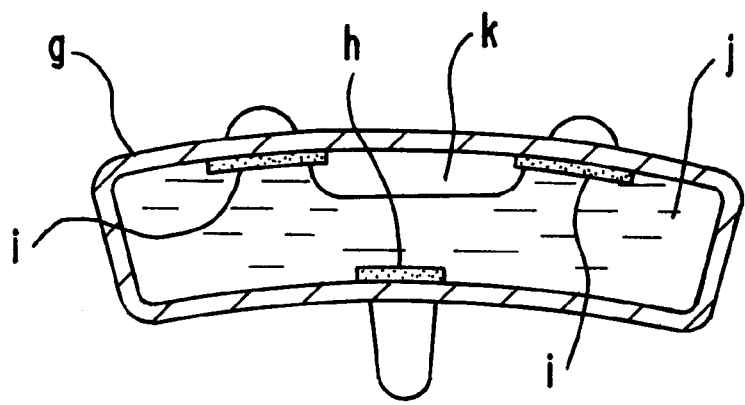
FIG. 5 is a sectional view showing an example of a conventional uniaxial horizontal sensor.
Figure 2:
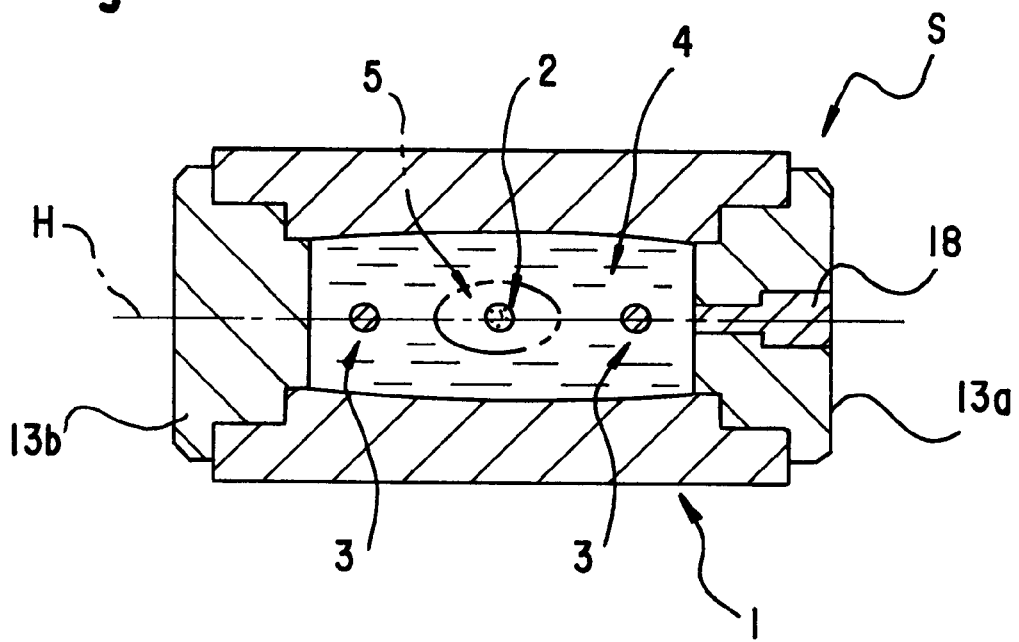
FIG. 2 is a sectional view on the line A—A in FIG. 1.

FIG. 1 is a length direction vertical sectional view of a uniaxial horizontal sensor (S) according to a preferred embodiment of the invention, FIG. 2 is a sectional view of the uniaxial horizontal sensor (S) on the line A—A in FIG. 1, and FIG. 3 is a side view of the uniaxial horizontal sensor (S). The uniaxial horizontal sensor (S) is made up of an electrode holding body (1), a common electrode (2), two peripheral electrodes (3) and an electrolyte (4) and a bubble (5) sealed inside the electrode holding body (1).

The electrode holding body (1) is made up of an electrode chamber forming main body (12) of cross-sectionally substantially octagonal tubular form made of polycarbonate as an insulating material and having formed therein an electrode chamber (11) open at both ends and two sealing end plates (13a), (13b) also made of polycarbonate.

The inside wall surface of the electrode chamber (11) of the electrode chamber forming main body (12) is of a surface of rotation shape obtained by rotating a circular arc line (AL) of a large radius (100 mm) with a point (P) on a vertical line (V) passing through the center as its center and bisected by the vertical line (V) about a horizontal center axis (H) intersecting orthogonally with the radius of the circular arc line (AL) on the vertical line (V) and therefore circular in any cross-section orthogonal to the horizontal center axis the electrode chamber (11) is circular (diameter of largest part 6 mm) as shown with broken lines in the side view of FIG. 3, and the three-dimensional surface roughness of this inside wall surface is made JIS Rmax 0.2S or below and sealing counterbores (14) for liquid tightly fitting the sealing end plates (13a), (13b) into are formed in both end openings.

In the position through which the vertical line (V) passes a common electrode fixing hole (15) and in positions left-right symmetrical about this as center and below the horizontal center axis (H) peripheral electrode fixing holes (16) are respectively provided in the electrode chamber forming main body (12) passing in the radial direction of the electrode chamber (11) through a horizontal bottom face (B) which is parallel to a horizontal plane including the horizontal center axis (H) and is one of the faces of the substantially octagonal shape and has had its horizontal precision raised.

The two sealing end plates (13a), (13b) made of polycarbonate are fixed in the sealing counterbores (14) of the electrode chamber forming main body (12); a charging hole (17) for charging the electrolyte (4) and the bubble (5) is provided passing through the end plate (13a), and after the electrolyte (4) and the bubble (5) are charged a sealing plug (18) is fitted into the charging hole (17) and liquid tightly sealed by welding means or the like.

The common electrode (2) and the two peripheral electrodes (3) are of diameter 0.6 mm and made using 18K(Au), which is a metal material having a low ionization tendency, and their surfaces are polished equally; the common electrode (2) projects into the electrode chamber (11) to a length such that it is always immersed in the electrolyte (4) without making contact with the bubble (5) sealed in with the electrolyte (4), and the peripheral electrodes (3) to a length such that they are as close as possible to the inside wall surface on a diametral line of the electrode chamber (11), and they are respectively so vertically fixed in the common electrode fixing hole (15) and the peripheral electrode fixing holes (16) provided passing through the horizontal bottom face (B) of the electrode chamber forming main body (12) that their electrode rear end parts project from the horizontal bottom face (B).

The electrolyte (4), to make its surface tension small and its boiling point high and its freezing point low, is one made by mixing pure water as a solvent, magnesium sulfate as a solute and either anhydrous methanol or anhydrous ethanol as a solution in such a ratio that the inter-electrode impedance becomes 40 to 50KΩ, and the amount thereof sealed in is an amount such that the common electrode (2) is always immersed and does not make contact with the sealed-in bubble (5), and the bubble (5) is an amount of air such that it does not make contact with the peripheral electrodes (3) in the horizontal state; they are each charged through the charging hole (17) and the charging hole (17) is liquid tightly sealed with the sealing plug (18) after charging.

As means for converting the position of the bubble (5) of the uniaxial horizontal sensor (S) of the preferred embodiment described above directly into an electrical signal, for example as shown in the sensor circuit diagram of FIG. 4, means for generating a predetermined 4 KHz base pulse from an alternating current with an oscillator OSC, making this a 2 KHz pulse of duty 50% with a frequency divider F/F, impressing this pulse on the peripheral electrodes (3) of a uniaxial horizontal sensor (S) according to the invention using a buffer amplifier SPI and a buffer amplifier SP2 of the reverse phase pulse thereof, and to extract information from this, drawing a signal from the common electrode (2) into a signal amplifying circuit AMP1, drawing the output thereof into an analogue switch MP by way of an amplifying circuit AMP2 having a zero drift correcting function based on a variable resistance VR1 and drawing a synchronizing signal from the frequency divider F/F into the analogue switch, feeding an analogue signal synchronized in the analogue switch into an amplifier AMP3 by way of a sample and hold circuit SH1 and outputting from this amplifier AMP3 a predetermined analogue signal corresponding to inclination can be employed, but the invention is not limited to this and it may of course be replaced with a known converting means.

A uniaxial horizontal sensor of the invention is used by being fixed to a flat surface of an apparatus or device required to be installed horizontally, and by mechanical control means the same as in a conventional method, for example, on the basis of a digital signal converted with a signal convertor motors for adjusting inclination are driven and this rotation is converted to linear motion and the inclination of the surface on which the sensor is mounted is changed and control is carried out so that the analogue signal becomes zero. By using two uniaxial horizontal sensors of the invention disposed intersecting horizontally orthogonally, they can also be used for obtaining the horizontal as a biaxial sensor.

With in a uniaxial horizontal sensor according to the invention constructed as described above, because among the common electrode positioned on a vertical line connecting the electrode chamber center and the center of curvature of the circular arc line of the inner peripheral wall surface at inclination angle zero (completely horizontal state) and vertically below a curved surface of the shape of a surface of rotation formed by rotating the circular arc line about the horizontal center axis and the peripheral electrodes on the left and right thereof, the common electrode is always immersed in the electrolyte and does not make contact with the bubble, and in the horizontal state the peripheral electrodes in a state wherein they do not make contact with the bubble are always immersed in the electrolyte having a small surface tension and mixed in such a ratio that the inter-electrode impedance becomes a predetermined value, when the bubble displaces along the curved surface forming the inner surface of the electrode chamber due to the existence of an inclination the inter-electrode impedance changes according to the position of the bubble and this change can be converted directly into an electrical signal and outputted as an analogue angle information signal, and using this analogue signal by means of mechanical control means, on the basis of this horizontal control bringing the analogue signal to inclination angle zero (completely horizontal state) can be carried out and a levelness of high inclination angle zero accuracy can be obtained.

In particular, as a result of the inner wall of the electrode chamber being made an encircling wall having an inner peripheral wall surface of a high three-dimensional surface roughness and of a surface of rotation shape obtained by rotating a circular arc line of a predetermined radius with a point on a vertical line as its center and bisected by the vertical line about a horizontal center axis intersecting orthogonally with the vertical line and therefore circular in any cross-section orthogonal to the horizontal center axis, with respect to inclinations other than the uniaxial horizontal being measured, causes of measurement errors are eliminated, and because the common electrode is always immersed in the electrolyte and does not make contact with the bubble and in the horizontal state the peripheral electrodes do not make contact with the bubble, changes in inter-electrode impedance occurring due to positional displacement of the bubble can be detected stereoscopically and the angle information output is high.

As a result of an electrolyte made by mixing pure water as a solvent, magnesium sulfate as a solute and either anhydrous methanol or anhydrous ethanol as a solution in such a ratio that the inter-electrode impedance becomes 40 to 50KΩ to make its surface tension small and its boiling point high and its freezing point low being used and the three-dimensional surface roughness of the inner surface of the electrode chamber being made high, output fluctuation errors caused by physical changes such as expansion and contraction and surface tension of the electrolyte occurring due to changes in the surrounding temperature are extremely small and it is possible to secure high accuracy and reproducibility, and it is possible to bring the attitude of an object device on which the sensor is used to a highly accurate state of inclination angle zero (completely horizontal).

Thus, it is possible to provide cheaply a uniaxial horizontal sensor ideal for use in automatic leveling of machines and devices and in leveling devices, angle gauges, surveying instruments, measuring instruments, aircraft, ships, railway cars, automobiles and other fields where highly accurate levelness is required.

What is claimed is:
1. A uniaxial horizontal sensor comprising:
an electrode holding body made of an insulating material and having an electrode chamber for an electrolyte and a bubble to be sealed inside formed by an encircling wall having an inner peripheral wall surface of rotation shape obtained by rotating a circular arc line of a predetermined radius with a point on a vertical line about a horizontal center axis intersecting orthogonally with the radius of the circular arc line on the vertical line and therefore circular in a cross-section orthogonal to the horizontal center axis and sealing end plates blocking openings at the ends of the encircling wall;
a common electrode projecting into the electrode chamber radially in the same position as the vertical line and peripheral electrodes projecting into the electrode chamber to a greater height than the common electrode, aligned to extend through the horizontal center axis, positioned symmetrically about the common electrode, having equal surface area, and being liquid-tight with respect to outside of the electrode holding body; and
means for generating a predetermined base pulse from an alternating current with an oscillator and making this a pulse of duty 50% with a frequency divider and impressing this pulse on the peripheral electrodes using a buffer amplifier and a buffer amplifier of a reverse phase pulse thereof and to extract information from this by drawing a signal from the common electrode into an amplifying circuit and drawing the output thereof into an analogue switch by way of two amplifying circuits having a zero drift correcting function and drawing a synchronizing signal from the frequency divider into the analogue switch and feeding an analogue signal synchronized in the analogue switch into an amplifier by way of a sample and hold circuit and outputting from this amplifier an analogue signal corresponding to inclination of the sensor,
wherein a bubble and an electrolyte mixed in such a ratio that the inter-electrode impedance assumes a predetermined value when the sensor is horizontal are sealed inside the electrode chamber in such a state that the common electrode is always immersed in the electrolyte and does not make contact with the bubble and when the sensor is horizontal the peripheral electrodes also do not make contact with the bubble.

* * * * *